(12) United States Patent
McMurry et al.

(10) Patent No.: US 8,478,859 B2
(45) Date of Patent: Jul. 2, 2013

(54) PROVIDING AN AGGREGATE REACHABILITY STATUS

(75) Inventors: Kathleen A. McMurry, Richardson, TX (US); David W. Butt, San Jose, CA (US); Stephen Levy, Cary, NC (US); David A. Ladd, Lisle, IL (US); Dale J. Seavey, Sunol, CA (US); Peter M. Gits, Claredon Hills, IL (US); David J. Novice, Baltimore, MD (US)

(73) Assignee: Cisco Technology, Inc., San Jose, CA (US)

( * ) Notice: Subject to any disclaimer, the term of this patent is extended or adjusted under 35 U.S.C. 154(b) by 2159 days.

(21) Appl. No.: 11/277,201

(22) Filed: Mar. 22, 2006

(65) Prior Publication Data

US 2007/0226357 A1    Sep. 27, 2007

(51) Int. Cl.
*G06F 15/173* (2006.01)

(52) U.S. Cl.
USPC ............................................... 709/224

(58) Field of Classification Search
USPC .. 709/224, 223, 245, 242, 249, 221; 455/445, 455/414.1, 411, 426.1, 419; 370/254, 338, 370/352, 389, 395.2
See application file for complete search history.

(56) References Cited

U.S. PATENT DOCUMENTS

| | | | |
|---|---|---|---|
| 6,658,095 B1 | 12/2003 | Yoakum et al. | 379/93.01 |
| 6,714,519 B2* | 3/2004 | Luzzatti et al. | 370/252 |
| 6,735,287 B2 | 5/2004 | Vishik et al. | 379/88.02 |
| 6,757,722 B2 | 6/2004 | Lonnfors et al. | 709/220 |
| 6,807,423 B1 | 10/2004 | Armstrong et al. | 455/440 |
| 6,839,735 B2 | 1/2005 | Wong et al. | 709/204 |
| 6,853,634 B1 | 2/2005 | Davies et al. | 370/349 |
| 6,934,380 B2 | 8/2005 | Shaffer et al. | |
| 6,993,327 B2 | 1/2006 | Mathis | 455/414.1 |
| 7,433,920 B2 | 10/2008 | Blagsvedt et al. | 709/204 |
| 7,593,984 B2 | 9/2009 | Morris | |
| 8,320,545 B2 | 11/2012 | Toebes et al. | |
| 2003/0053612 A1* | 3/2003 | Henrikson et al. | 379/202.01 |
| 2004/0059781 A1* | 3/2004 | Yoakum et al. | 709/204 |
| 2005/0068167 A1 | 3/2005 | Boyer et al. | |
| 2005/0198321 A1* | 9/2005 | Blohm | 709/228 |
| 2006/0013140 A1 | 1/2006 | Pushparaj | |

(Continued)

FOREIGN PATENT DOCUMENTS

| | | |
|---|---|---|
| CN | 1692400 A | 11/2005 |
| EP | 1 416 696 | 5/2004 |

OTHER PUBLICATIONS

Microsoft Office Online, "Live Communications Server Feature Comparison," www.microsoft.com/office/livecomm/prodinfo/compare.mspx?pf=true, 5 pages, Apr. 5, 2005.

(Continued)

*Primary Examiner* — Asad Nawaz
*Assistant Examiner* — Saad A Waqas
(74) *Attorney, Agent, or Firm* — Baker Botts L.L.P.

(57) ABSTRACT

A customizable mechanism is provided for determining and reporting the overall reachability of a user based on the current statuses of a variety of network elements associated with the user, such as devices or applications that a user may use to communicate with others. The system can evaluate customizable reachability rules to determine an overall reachability status for the user. The system provides for distribution of reachability status and presence statuses of network elements to authorized subscribers.

25 Claims, 7 Drawing Sheets

U.S. PATENT DOCUMENTS

| | | |
|---|---|---|
| 2006/0015609 A1 | 1/2006 | Hagale et al. ................ 709/224 |
| 2006/0030264 A1 | 2/2006 | Morris |
| 2006/0285670 A1* | 12/2006 | Chin et al. ............... 379/201.01 |
| 2007/0198696 A1* | 8/2007 | Morris ........................ 709/224 |
| 2008/0065755 A1 | 3/2008 | Caspi et al. |
| 2009/0282147 A1 | 11/2009 | Morris |

OTHER PUBLICATIONS

Rosenberg, "Presence Authorization Rules," www.softarmor.com/wgdb/docs/draft-ietf-simple-presence-rules-02.txt, 27 pages, Aug. 22, 2005.

Microsoft Office Online, "Live Communications Server 2005 Overview," 3 pages, Apr. 26, 2005.

Rosenberg, "Presence Authorization Rules," www.softarmor.com/wgdb/docs/draft-ietf-simple-presence-rules-04.txt, 27 pages, Apr. 27, 2006.

PCT International Search Report and Written Opinion (ISA/US) for PCT/US07/01390 (9 pages), Oct. 19, 2007.

The First Office Action issued by the State Intellectual Property Office of the People's Republic of China; Filing No. 200780003553.0, Date of Issue: Oct. 9, 2009.

The Second Office Action issued by the Patent Office of the People's Republic of China; Application No. 200780003553.0; Serial No. 2010040900442780, Apr. 14, 2010.

USPTO, Office Action, U.S. Appl. No. 11/774,007, Dec. 29, 2010.

USPTO, Office Action, U.S. Appl. No. 11/774,007, Apr. 28, 2011.

European Patent Office Communication (EPO) and extended Search report for Application No. 07748982.1-1244, Dec. 14, 2011.

The Fourth Office Action issued by the Patent Office of the People's Republic of China for Application No. 200780003553.0, Nov. 23, 2011.

The Fifth Office Action issued by the Patent Office of the People's Republic of China for Application No. 200780003553.0, May 23, 2012.

The Sixth Office Action issued by the Patent Office of the People's Republic of China for Application No. 200780003553.0, Oct. 15, 2012.

Third Office Action issued by the Patent Office of the People's Republic of China; Application No. 200780003553.0; Chinese Office Action and English translation, Jun. 16, 2011.

* cited by examiner

FIG. 2

When events that you choose occur, your reachability automatically updates to the following states:

On Vacation — 52a
- ☑ When my calendar shows that I am on vacation — 56

Out of Office — 52b
- ☑ When my calendar shows that I am out of the office

Unavailable — 52c
- ☑ When the time is outside my specified work hours — 60
- ☑ When my primary instant messager status is unavailable — 62
- ☑ When my desk phone is set to unavailable — 64
- ☑ When my cell phone is set to unavailable — 66

Do Not Disturb — 52d
- ☑ When I am on a call on my desk phone
- ☑ When I am on a call on my cell phone
- ☑ When my primary instant messager status is do not disturb

Busy — 52e
- ☑ When I am on a call on my desk phone
- ☑ When I am on a call on my cell phone
- ☑ When my primary instant messager status is busy
- ☑ When my calendar shows that I am busy during my specified work hours

Interruptible but Busy — 52f
- ☑ When I am on a call on my desk phone
- ☑ When I am on a call on my cell phone
- ☑ When my primary instant messager status is busy
- ☑ When my calendar shows that I am busy during my specified work hours

Available — 52g
- ☑ When my calendar shows that I am available during my specified work hours
- ☑ When my primary instant messager status is available
- ☑ When my desk phone is available
- ☑ When my cell phone is available

Current Time Zone

Label: ( )
Time zone: ( (GMT-08:00) Pacific Time (US & Canada); Tijuana ▼ )
☑ Adjust for daylight saving time
Current time: ( Wed 7/26/2005 11:37 AM )
Work hours: Start time: ( 8:00 am ▼ ) End time: ( 5:00 pm ▼ )

( Restore Defaults )

PROVIDING AN AGGREGATE REACHABILITY STATUS

TECHNICAL FIELD OF THE INVENTION

The present invention relates generally to network communications and, more particularly, to providing an aggregate reachability status of a user.

BACKGROUND OF THE INVENTION

With the advent of increasing network and processing capabilities, individuals often use multiple devices or applications for communication. For example, one person may have cell and home phones, email, and an instant messaging service to use for communicating with others. In certain systems, a central management service can manage or monitor individual devices associated with various users.

SUMMARY OF THE INVENTION

In accordance with the present invention, techniques for providing an aggregate reachability status for a user are provided. According to particular embodiments, these techniques describe a mechanism customizable by a user for determining and reporting the overall reachability of a person based on the current statuses of a variety of network elements associated with the user.

According to a particular embodiment, a method for providing reachability status to subscribers includes presenting a set of reachability states. Each reachability state represents an aggregate accessibility of a user derived from a set of statuses, where each status corresponds to one of a set of network elements associated with the user. For each of the reachability states, at least one reachability rule is presented. Each reachability rule corresponds to one of the network elements and indicates a status for satisfying the reachability rule. A selection of one or more of the reachability rules is received. A central storage maintaining the statuses corresponding to the network elements is accessed. An order of the reachability rules is identified. Until a current reachability status is selected: (1) a reachability rule is identified based on the identified ordering; (2) it is determined whether the reachability rule is satisfied; and (3) if the identified reachability rule is satisfied, the reachability state associated with the identified reachability rule is selected as the current reachability status. One or more subscribers for receiving the current reachability status are determined, and the current reachability status is communicated to subscribers.

Embodiments of the invention provide various technical advantages. For example, these techniques may allow subscribers to see a unified reachability status of a user. The unified reachability status may replace or supplement multiple separate pieces of information regarding availability of a user and statuses of his communication devices. In some embodiments, a user may customize reachability rules, which reduces the possibility that a subscriber may incorrectly determine the user's availability. Also, in particular embodiments, efficiency and convenience could be increased by allowing a user to select a preferred communication device, which may indicate to subscribers the best method of contacting the user. In some embodiments, a user may customize his visibility, allowing some subscribers to see certain presence and/or reachability information that is different from what other subscribers see.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is made to the following description taken in conjunction with the accompanying drawings in which:

FIG. 2 illustrates a user interface for customization of the user's reachability rules;

DETAILED DESCRIPTION OF THE DRAWINGS

Figure 1:
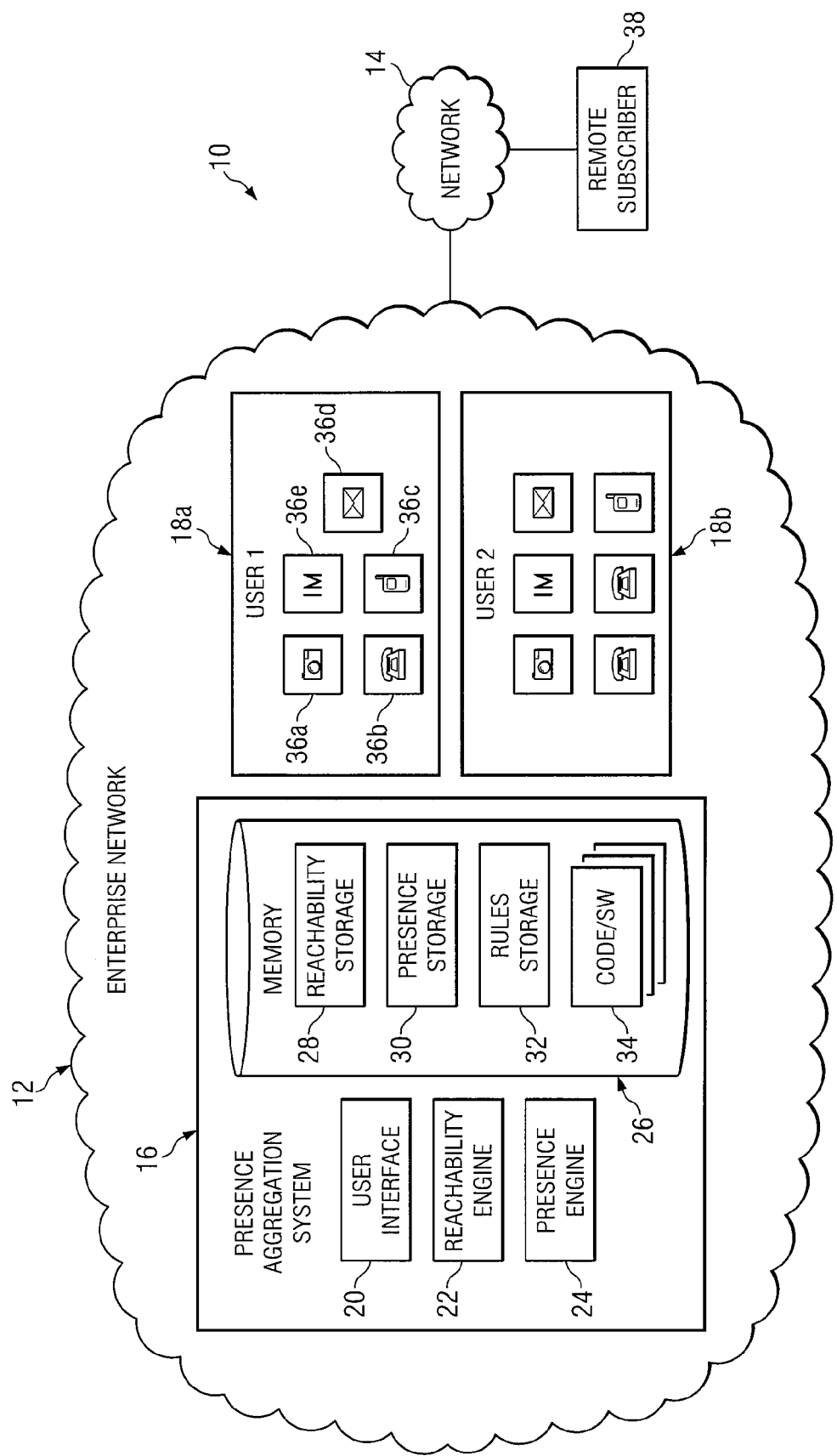
FIG. 1 illustrates a system for providing an aggregate reachability status of a user.

FIG. 1 illustrates a system, indicated generally at 10, for providing an aggregate reachability status. As illustrated, system 10 includes an enterprise network 12 and a communications network 14, which may interconnect using any suitable techniques or protocols. In general, elements within enterprise network 12 interoperate to determine aggregate reachability statuses for various system users and to report these aggregate reachability statuses to appropriate subscribers.

Enterprise network 12 represents any suitable collection of hardware, software, and controlling logic to interconnect elements coupled to enterprise network 12. Thus, enterprise network 12 provides an infrastructure to support communications between attached devices. In particular embodiments, enterprise network 12 may include one or multiple networks such as a telecommunications network, a satellite network, a cable network, local area networks (LANs), wide area networks (WANs), the internet and/or any other appropriate networks. As illustrated, enterprise network 12 includes a presence aggregation system 16 and multiple users 18. Users 18 and presence aggregation system 16 communicate using any suitable techniques or protocols for communication within enterprise network 12.

Presence aggregation system 16 includes a user interface 20, a reachability engine 22, a presence engine 24, and memory 26. Within presence aggregation system 16, memory 26 includes a reachability storage 28, a presence storage 30, a rules storage 32, and software 34. While the information located in memory 26 is graphically depicted as individual storages, it is understood that the equivalent information can be stored in any appropriate manner. The information described as being located in memory may be stored in a variety of different ways including in files, arrays, databases, etc.

User interface 20 provides an interface through which users 18 can communicate with presence aggregation system 16. In particular embodiments this may include operation through a graphical user interface presented to user 18, for example, through a computer, personal digital assistant (PDA), cell phone, or other device. User interface 20 is responsible for facilitating interactions to create, modify, and/or delete reachability rules, which may be customizable by users 18 and used to determine a reachability status. A reachability status for one of users 18 broadly indicates an aggregation of status information obtained from a group of network elements 36 associated with user 18. That is, reachability status for user 18 may be derived from the individual statuses of multiple network elements associated with user 18. The reachability status of one of users 18 may be any one of a number of enumerated reachability states. Reachability states and reachability status are discussed in greater detail below.

In certain embodiments, user interface 20 presents to user 18 a plurality of rules corresponding to different reachability statuses. After user 18 indicates particular rules to apply, user interface 20 receives the information and stores it in the rules storage 32. In some embodiments, user interface 20 is used to query users 18 to obtain updated reachability rules. In other embodiments, users 18 send reachability rules to presence aggregation system 16 through user interface 20 after users 18 update the reachability rules.

Presence engine 24 monitors presence information of network elements 36. In some embodiments, presence engine 24 may be responsible for tracking associations of specific network elements 36 with particular users 18. In the example illustrated, five network elements 36 are associated with user 18a: a video phone 36a, an office phone 36b, a cell phone 36c, an email address 36d, and an instant messaging client 36e. Presence engine 24 may track the association of these network elements 36a-e with user 18a and may further monitor presence status for network elements 36a-e. Similarly, presence engine 24 may track associations of other network elements 36 with other users 18 and monitor presence status for those network elements 36. Presence engine 24 stores the presence status of each network element 36 in presence storage 30. Presence status indicates a current state of a network element. For example, presence status may indicate that a network element is busy, offline, unavailable, etc. In particular embodiments, presence engine 24 may also distribute the presence statuses of network elements 36 associated with a particular user 18 to other users 18 or remote subscribers 38. Remote subscriber 38 will be discussed in more detail below.

Reachability engine 22 determines reachability statuses for users 18 based on presence statuses maintained by presence engine 24 and reachability rules obtained by user interface 20. Reachability engine 22 may distribute reachability status to other users 18 or remote subscribers 38. To determine a reachability status for a particular user 18, reachability engine 22 may access rules storage 32 to obtain the reachability rules for particular user 18, access presence storage 30 to obtain the presence status of network elements 36 associated with the particular user 18, and apply the obtained presence status of network elements 36 to the reachability rules of the particular user 18 in order to obtain a reachability status for user 18. Reachability engine 22 may then store this information in reachability storage 28. Reachability engine 22 may distribute the reachability status of particular user 18 to subscribers, such as other users 18.

Software 34 includes any suitable programs, software, hardware, logic, or circuitry and is capable when executed to control the operation of various elements in presence aggregation system 16 and to perform any other functions required by presence aggregation system 16. Software 34 may or may not be included in presence aggregation system 16.

While presence aggregation system 16 is depicted as a single element containing a particular configuration and arrangement of modules, it should be noted that this is a logical depiction, and the components and functionality of presence aggregation system 16 may be located at one or more physical locations. Also, the functionality of presence aggregation system 16 may be provided by any suitable collection and arrangement of components. The functions performed by the various components of presence aggregation system 16 may be accomplished by any suitable devices to provide aggregate reachability statuses of users 18.

Users 18 communicate with presence aggregation system 16 to provide customized reachability rules and to receive reachability statuses for other users 18. While FIG. 1 depicts two users, user 18a and user 18b, it is understood that enterprise network 12 may include any number of users 18. As noted above, five network elements 36 are associated with user 18a: a video phone 36a, an office phone 36b, a cell phone 36c, an email address 36d, and an instant messaging client 36e. In particular embodiments, network elements 36 include calendaring and location services, which are not illustrated. The depicted and described network elements 36 are only illustrative, however, and it should be understood that network elements 36 can include any of these devices and applications or any other end user network endpoint services that user 18 may use to communicate with others. Each user 18 may have associated with him all, some, or none of the listed network elements 36 or may include additional, unlisted network elements 36. As shown by user 18b, different users 18 may have different sets of associated network elements 36.

In particular embodiments, remote subscribers—those located remotely to enterprise network 12—may subscribe to notification services supported by presence aggregation system 16. In the embodiment illustrated, remote subscriber 38 connects to enterprise network 12 through network 14. Network 14 represents any suitable collection of hardware, software, and controlling logic for interconnecting communications devices. In a particular embodiment, network 14 may include one or multiple networks such as a telecommunications network, a satellite network, a cable network, local area networks (LANs), wide area networks (WANs), the internet and/or any other appropriate networks. Remote subscriber 38 may be authorized to subscribe to receive reachability status and/or network element 36 presence status(es). In particular embodiments, remote subscriber 38 may provide reachability status and/or presence status for network elements that may be associated with remote subscriber 38. System 10 contemplates enterprise network 12 and elements within enterprise network 12 implementing appropriate access restrictions and other security measures to protect users 18 from unauthorized or otherwise inappropriate access to status information regarding users 18.

In operation, presence aggregation system 16 maintains presence status of network elements 36, obtains and stores reachability rules, determines reachability status for users 18, and provides reachability status and presence status to appropriate subscribers.

To maintain presence statuses of network elements 36, presence engine 24 collects status information for network elements 36 associated with users 18 and also may track associations of specific network elements 36 with particular users 18. To obtain this information, presence engine 24 may query individual network elements 36, or network elements 36 may be responsible for notifying presence engine 24 upon a change in presence status or association. In the embodiment illustrated, presence aggregation system 16 stores the presence status of network elements 36 in presence storage 30.

Presence aggregation system 16 also obtains and stores reachability rules. Presence aggregation system 16 may employ user interface 20 to interface with users 18. For example, through user interface 20, presence aggregation system 16 may present multiple rules associated with different reachability states, from which users 18 may select particular rules to use. Presence aggregation system 16 may then use the selected rules to determine the reachability status for user 18. User interface 20 may store the reachability rules in rules storage 32.

Presence aggregation system 16 determines reachability statuses for users 18 with reachability engine 22. Reachability engine 22 accesses presence storage 30 to obtain the presence statuses of network elements 36 associated with users 18. Reachability engine 22 also accesses rules storage 32 to obtain reachability rules. Then, reachability engine 22 applies the presence statuses of network elements 36 to the reachability rules to determine the reachability statuses of users 18 and stores the reachability statuses of users 18 in reachability storage 28.

Presence aggregation system 16 also provides information regarding reachability status and presence status to appropriate subscribers. In the embodiment illustrated, presence aggregation system 16 uses reachability engine 22 to provide reachability status to authorized subscribers and presence engine 24 to provide presence status to authorized subscribers. Authorized subscribers include others of users 18 and remote subscribers 38 authorized by users 18, system administrators, or other appropriate authorizing agents. For example, reachability engine 22 may determine which subscribers are authorized to receive the reachability statuses of users 18 using configurations or other settings provided by users 18. Alternatively, other components or devices in presence aggregation system 16 may determine which subscribers are authorized to receive reachability statuses. Reachability engine 22 then may present the reachability statuses to authorized subscribers.

Similarly, presence engine 24 may provide presence information to authorized subscribers. Authorizations for subscriptions to presence information may be maintained distinctly from authorizations to receive reachability information. For example, subscribers authorized to receive reachability status for a particular user 18 may or may not be authorized to receive presence status for that user 18. Thus a particular user 18 may enable various subscribers to receive the relatively less detailed aggregate reachability status while preventing access to the more detailed information regarding presence statuses of individual network elements 36. According to particular embodiments, presence engine 24 determines which subscribers are authorized to receive the presence statuses of network elements 36 associated with users 18. Alternatively, other components or devices in presence aggregation system 16 may determine which subscribers are authorized to receive presence statuses. Presence engine 24 then presents the presence statuses of network elements 36 to authorized subscribers.

For example, if reachability engine 22 determines that both user 18b and remote subscriber 38 are authorized to receive the reachability status of user 18a, reachability engine 22 presents the reachability status of user 18a to both user 18b and remote subscriber 38. Similarly, upon determining that user 18b is authorized to receive the presence statuses of all network elements 36 associated with user 18a, presence engine 24 presents the presence statuses of network elements 36a-e to user 18b. However, presence engine 24 may determine that remote subscriber 38 is not authorized to receive the presence statuses of network elements 36a-e associated with user 18a. In that case, presence engine 24 will not present the presence status of network elements 36a-e to remote subscriber 38. Alternatively, presence engine 24 may determine that remote subscriber 38 is authorized to receive only the presence statuses associated with particular network elements 36 associated with user 18a. In that case, presence engine 24 would distribute only those authorized presence statuses to remote subscriber 38.

Particular embodiments of a system for providing an aggregate reachability status have been described and are not intended to be all inclusive. While system 10 is depicted as containing a certain configuration and arrangement of elements, it should be noted that this is a logical depiction, and the components and functionality of system 10 may be combined, separated and distributed as appropriate both logically and physically. Also, the functionality of system 10 may be provided by any suitable collection and arrangement of components. The functions performed by the various components of presence aggregation system 16 may be accomplished by any suitable devices to provide aggregate reachability status.

FIG. 2 illustrates a user interface, indicated generally at 50, for customization of reachability rules for user 18. User interface 50 displays a list of reachability states 52: On Vacation 52a, Out of Office 52b, Unavailable 52c, Do Not Disturb 52d, Busy 52e, Interruptible but Busy 52f, and Available 52g. In some embodiments, unknown (not illustrated) may be another one of reachability states 52. In the illustrated embodiment, each reachability state 52 has at least one rule directly below it. The rules listed beneath a reachability state 52 are associated with that reachability state 52. For example, rule 56 ("When my calendar shows that I am on vacation") is associated with On Vacation 52a. In particular embodiments, user interface 50 also displays a checkbox 54 next to each rule.

Section 58 depicts one reachability state, Unavailable 52c, and its associated rules 60, 62, 64, and 66. Rule 60 is true when the current time is outside the specified work hours. In some embodiments, user 18 manually identifies work hours, time zone, and current time in section 68. In other embodiments, the system automatically determines the work hours, time zone, and current time for user 18 using any appropriate means. Rule 62 is true when the presence status of the primary instant messenger is unavailable. Rule 64 is true when the desk phone currently has an unavailable status. And, rule 66 is true when the cell phone currently has an unavailable status. Checkboxes 54 allow user 18 select rules. Once a rule is selected, it may be included as one of the reachability rules for user 18.

In operation, presence aggregation system 16 determines the reachability status of a particular user 18 by evaluating the reachability rules associated with the particular user 18. In some embodiments, presence aggregation system 16 begins at the first listed reachability state 52 in user interface 50, which, in the illustrated embodiment, is On Vacation 52a. In other embodiments, presence aggregation system 16 begins at the first listed reachability rule, which, in the illustrated embodiment, is rule 56. Presence aggregation system 16 determines whether the first selected rule is true. If not, presence aggregation system 16 proceeds to the next listed reachability rule in user interface 50, which, in the illustrated embodiment, is listed under Out of Office 52b. If that rule is not true, presence aggregation system proceeds to the nest listed reachability rule in user interface, which, in the illustrated embodiment, is rule 60. The process continues down the list of reachability rules until a selected rule is found to be true. When a rule is found to be true, the reachability status is set to the reachability state 52 associated with that rule.

This provides a top-down, hierarchical technique for specifying and determining reachability status. However, this is merely one method of operation, and it is understood that the process described may be accomplished in any order that operates to determine the reachability status of a particular user 18. The reachability states may be evaluated according to any type of algorithm, including a hierarchical or best fit algorithm. For example, the reachability rules may be evaluated in a different order than the order shown to users 18 on user interface 50. In particular embodiments, reachability states 52 could include some, all, or none of the enumerated states and could include additional states not specifically listed. Additionally, the rules illustrated in FIG. 2 are merely illustrative of the types of rules that can be associated with reachability states 52.

Figure 3A:
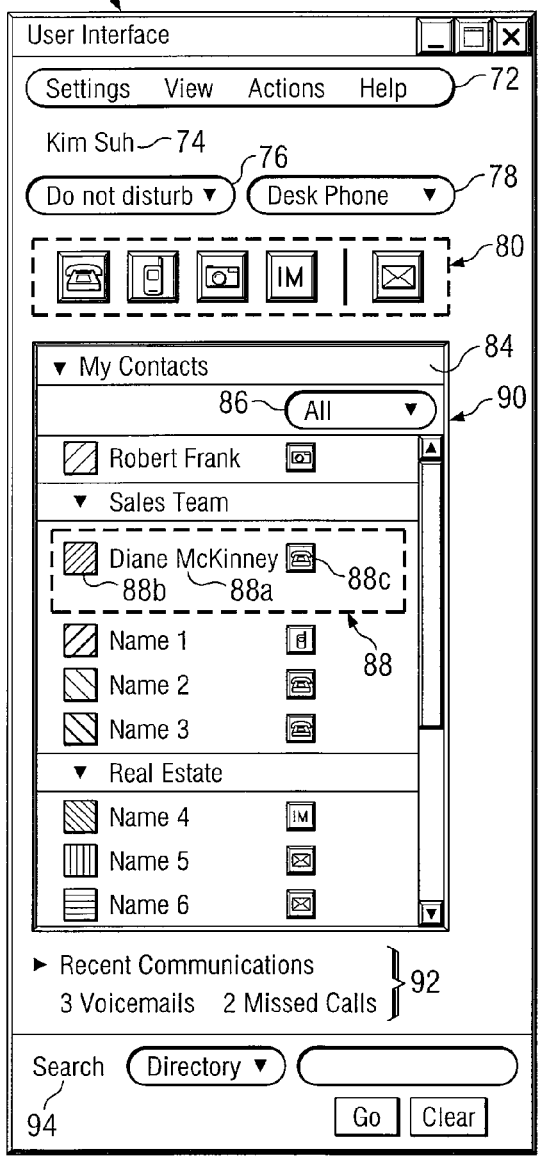
FIGS. 3A-3C illustrate parts of a graphical user interface for interfacing a user with a communication system that aggregates reachability statuses of users.
Figure 3B:
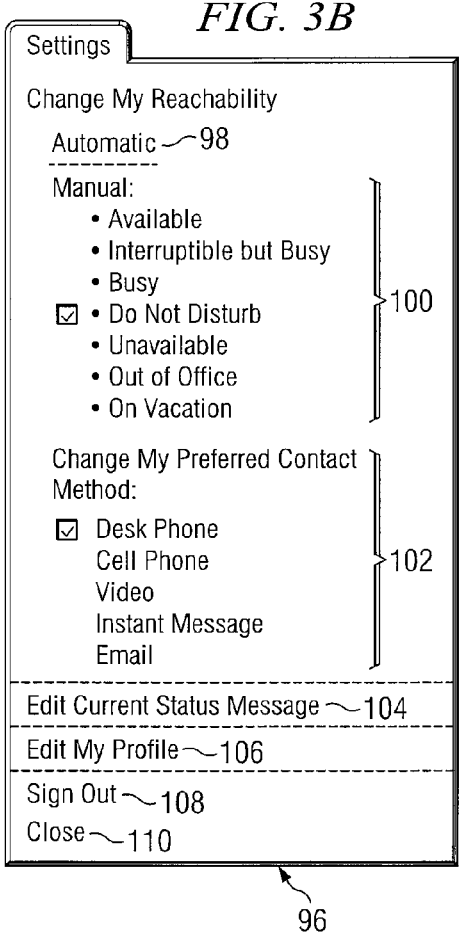
Figure 3C:
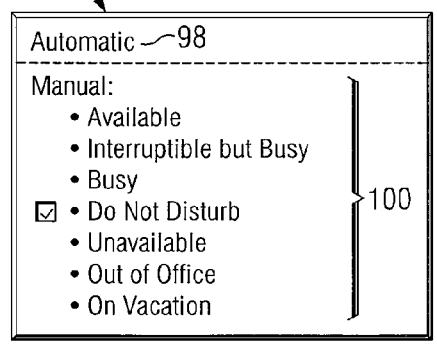

FIGS. 3A-3C illustrate parts of a graphical user interface for interfacing a user with a communication system that aggregates reachability statuses of users. FIG. 3A illustrates the main graphical user interface (GUI), indicated generally at 70. In the illustrated embodiment, GUI 70 includes a menu bar 72, a name 74, and drop down menus 76 and 78 for modification of reachability and method of contact preferences, respectively.

Drop down menu 76 allows user 18 to select a method of determining reachability status. In the illustrated embodiment, drop down menu 76 could allow user 18 to select between automatic and manual reachability status. The manual reachability status allows user 18 to select a particular reachability state (e.g., available, unavailable, busy, interruptible but busy, etc.) as the reachability status for user 18. In some embodiments, the manual reachability status includes an override of reachability or the case where no entry method is used. On the other hand, the automatic reachability status instructs the system to use the reachability rules associated with user 18 to determine the current reachability status of user 18. In particular embodiments, multiple automatic reachability statuses are presented to user 18, allowing user 18 to select between different reachability rule sets. Drop down menu 78 allows user 18 to quickly select a preferred method of contact, which is displayed to subscribers to indicate the manner in which user 18 prefers to be contacted (e.g. by desk phone, cell phone, video phone, email, instant message, etc.). In some embodiments, the methods of contact listed on drop down menu 78 correspond to the network elements 36 associated with the particular user 18 associated with GUI 70.

GUI 70 also may include icons 80, which correspond to different modes of communication. Icons 80 may be selected by user 18 to initiate communication with contacts 88 through the indicated modes. In some embodiments, the set of icons 80 displayed changes based on which contact 88 is selected. For example, the displayed icons 80 may correspond to network elements 36 associated with a particular contact 88. As illustrated, icons 80 include a desk telephone, a cell phone, a video phone, an instant messaging user name, and an email system. In certain embodiments, one particular icon 80 is separated from the rest of the icons 80 to designate a preferred method of contact. This designation is illustrated by a line in FIG. 3A.

As illustrated, GUI 70 also includes a contact menu 84, which displays a list of contacts of user 18. Within contact menu 84, user 18 can opt to display all, some, particular groups, or no contacts through drop down menu 86. In certain embodiments, contacts 88 may be divided into groups 90. For example, in the illustrated embodiment, group 90 includes all contacts 88 corresponding to a sales team. In particular embodiments, contacts 88 are identified by name 88*a* (e.g. Diane McKinney). In the displayed embodiment, a box 88*b* to the left of name 88*a* indicates the reachability status of the contact. The reachability status may be indicated in box 88*b* though the shading or color of box 88*b* or through any other appropriate means. A second box 88*c* to the right of name 88*a* indicates the preferred contact method selected by contact 88. In some embodiments, user 18 can initiate contact with contacts 88 through contact menu 84. While not specifically illustrated, GUI 70 may permit user 18 to specify additional information regarding contacts 88 for display. For example, user 18 could elect to display the presence status(es) of some or all network elements 36 associated with one or many contacts 88.

As illustrated, GUI 70 also includes a recent communication section 92, which may display recent communications sent and/or received by user 18. In the illustrated embodiment, recent communication section 92 displays the number of voicemails and missed calls user 18 received. GUI 70 also includes a search section 94. Search section 94 may allow user 18 to enter search information including the name of a contact, contact information for a particular contact, or other information. User 18 may also designate the information storage unit (e.g. the directory) in which GUI 70 should search.

FIG. 3B illustrates a settings menu, indicated generally at 96, that allows user 18 to customize particular aspects of the GUI 70 of FIG. 3A. Settings menu 96 allows user 18 to select either an automatic option 98 or one of manual options 100 for determination of reachability status. If user 18 selects automatic option 100, reachability rules associated with user 18 are used to determine the reachability status of user 18. Alternatively, user 18 may select a particular one of manual options 100 to manually set the reachability status of user 18. Manual options 100 list the selectable reachability states. For example, as illustrated, manual options 100 include: Available, Interruptible but Busy, Busy, Do Not Disturb, Unavailable, Out of Office, and On Vacation. In particular embodiments, manual options 100 may list some or all of reachability states 52. Once user 18 has selected one of manual options 100, the reachability status of user 18 will be the reachability state selected until changed by user 18.

Additionally, user 18 may select a preferred contact method with checkbox 102. In particular embodiments, user 18 may select between a desk phone, a cell phone, a video phone, an instant messaging program, or an email system as the preferred contact method. In particular embodiments, the preferred contact methods displayed correspond to some or all of network elements 36 associated with user 18. In the illustrated embodiment, settings menu 96 also allows user 18 to create, modify, and delete a current status message by selecting item 104. User 18 can place text in the current status message to send to subscribers. This text can be used, for example, to provide more detail as to the whereabouts or availability of user 18. Settings menu 96 also may permit user 18 to create, modify, and delete a user profile by selecting item 106. Finally, settings menu 96 may provide a manner in which user 18 can sign out of the system 108 or close the settings menu 110.

FIG. 3C illustrates options provided by drop down menu 76 of FIG. 3A. In certain embodiments, drop down menu 76 simply provides another way of accessing many of the same options as settings menu 96 of FIG. 3B (e.g. automatic option 98 and manual options 100). As above, user 18 may select an automatic option 98 to determine reachability status so that reachability status is determined by the reachability rules associated with user 18. Also, user 18 may select one of manual options 100 to set the reachability status manually to the particular manual option 100 chosen by user 18. Drop down menu 76 may be included to provide user 18 with a faster and easier way of selecting current reachability status.

Although GUI 70, settings menu 96, and drop down menu 76 of FIGS. 3A-C are displayed as having particular configurations of components that provide specific operations, it should be understood that system 10 contemplates implementing similar functions using any suitable interfaces, components, and/or devices. Additionally, the functions preformed by these components may be preformed in any appropriate order and/or may be omitted entirely. While illustrated in one manner, GUI 70 is intended to include any components or functionality for allowing user 18 to communicate with a communication system that provides reachability information about users.

Figure 4A:
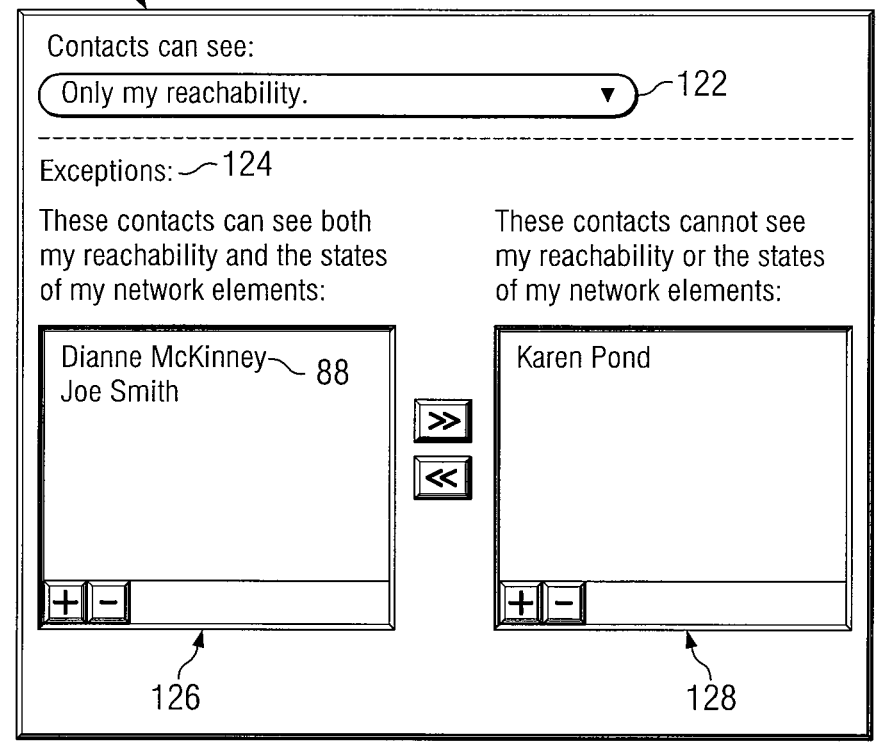
FIGS. 4A-4B illustrate an interface for visibility customization and associated menu for adding contacts.
Figure 4B:
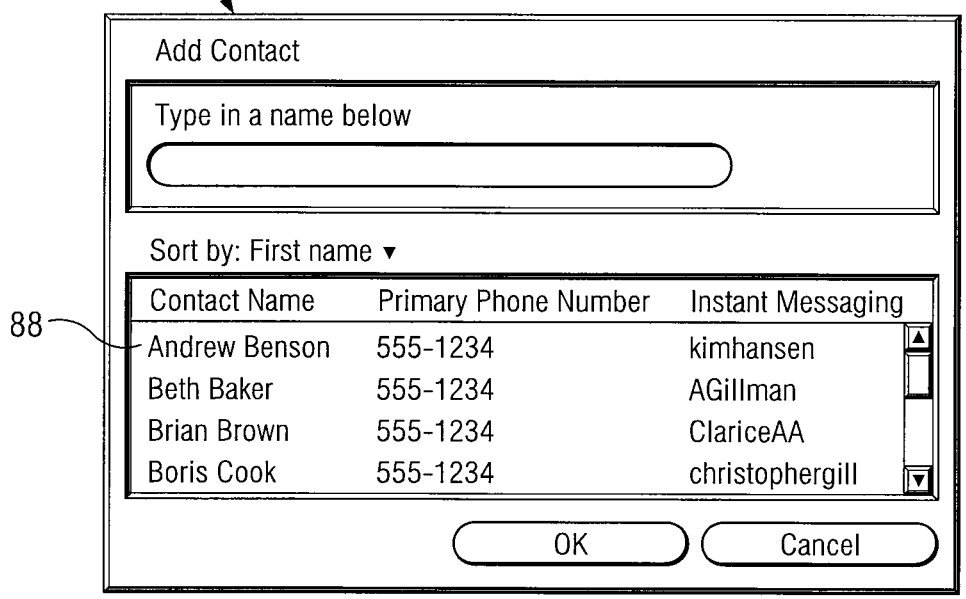

FIGS. 4A-4B illustrate an interface for visibility customization and associated menu for adding contacts. FIG. 4A illustrates a user interface, indicated generally at 120, that provides for customization of visibility for user 18. Generally, visibility determines what information, if any, is conveyed to contacts about reachability and presence statuses. In the illustrated embodiment, user 18 can customize visibility by selecting an option from a drop down menu 122. Drop down menu 122 may allow user 18 to select one of the following three default visibility rules: (1) contacts can see my reachability status and my presence statuses, (2) contacts can see my reachability status only, or (3) contacts can see neither my reachability status nor my presence statuses. Some embodiments include different default rules provided to user 18, and other embodiments do not provide default visibility rules at all.

User interface 120 includes an exception section 124 that allows user 18 to specify exceptions to the general visibility rule selected in drop down menu 122. Exception section 124 allows user 18 to specify particular contacts 88 who are not subject to the default rule selected in drop down menu 122. Instead, these particular contacts 88 are subject to a different visibility rule specified by user 18. As illustrated, boxes 126, 128 allow user 18 to select particular contacts who are authorized to receive reachability and presence status in accordance with each of the two default rules user 18 did not select in drop down menu 122. For example, user 18 specifies a default rule in drop down menu 122: contacts 88 can only see reachability status. Accordingly, in box 126, user 18 identifies contacts 88 who are authorized to receive both reachability and presence statuses, and in box 128, user 18 identifies contacts 88 who are authorized to receive neither reachability nor presence statuses.

In some embodiments, visibility rules specify a particular reachability state that specified contacts 88 receive for the reachability status of user 18. Thus, particular subscribers (or groups of subscribers) receive one reachability status while other subscribers receive a different reachability status. This would be beneficial, for example, because user 18 could want co-workers to receive an "Unavailable" status outside of work hours while friends and family receive an "Available" status. While depicted as having one configuration, it should be understood that user interface 120 may allow user 18 to establish visibility rules so that contacts 88 receive any information desired by user 18 regarding reachability and presence statuses.

FIG. 4B illustrates an add contact menu, indicated generally at 130, through which user 18 can select particular contacts 88. For example, contacts 88 can be selected so that user 18 can include contacts 88 in boxes 126, 128 of FIG. 4A. In some embodiments, add contact menu 130 can facilitate selection of contacts 88 for display on GUI 70 of FIG. 3A.

Although user interface 120 and add contact menu 130 of FIGS. 4A-B are displayed as having particular components or operations, it is understood that similar functions could be implemented by any number and type of components and/or devices. Additionally, the functions preformed by these components may be preformed in any appropriate order and/or may be omitted entirely. While illustrated in one manner, user interface 120 is intended to include any components or functionality necessary to allow user 18 to indicate desired visibility preferences. It is understood that visibility rules and exceptions can be specified and customized by user 18 in any appropriate manner.

Figure 5A:
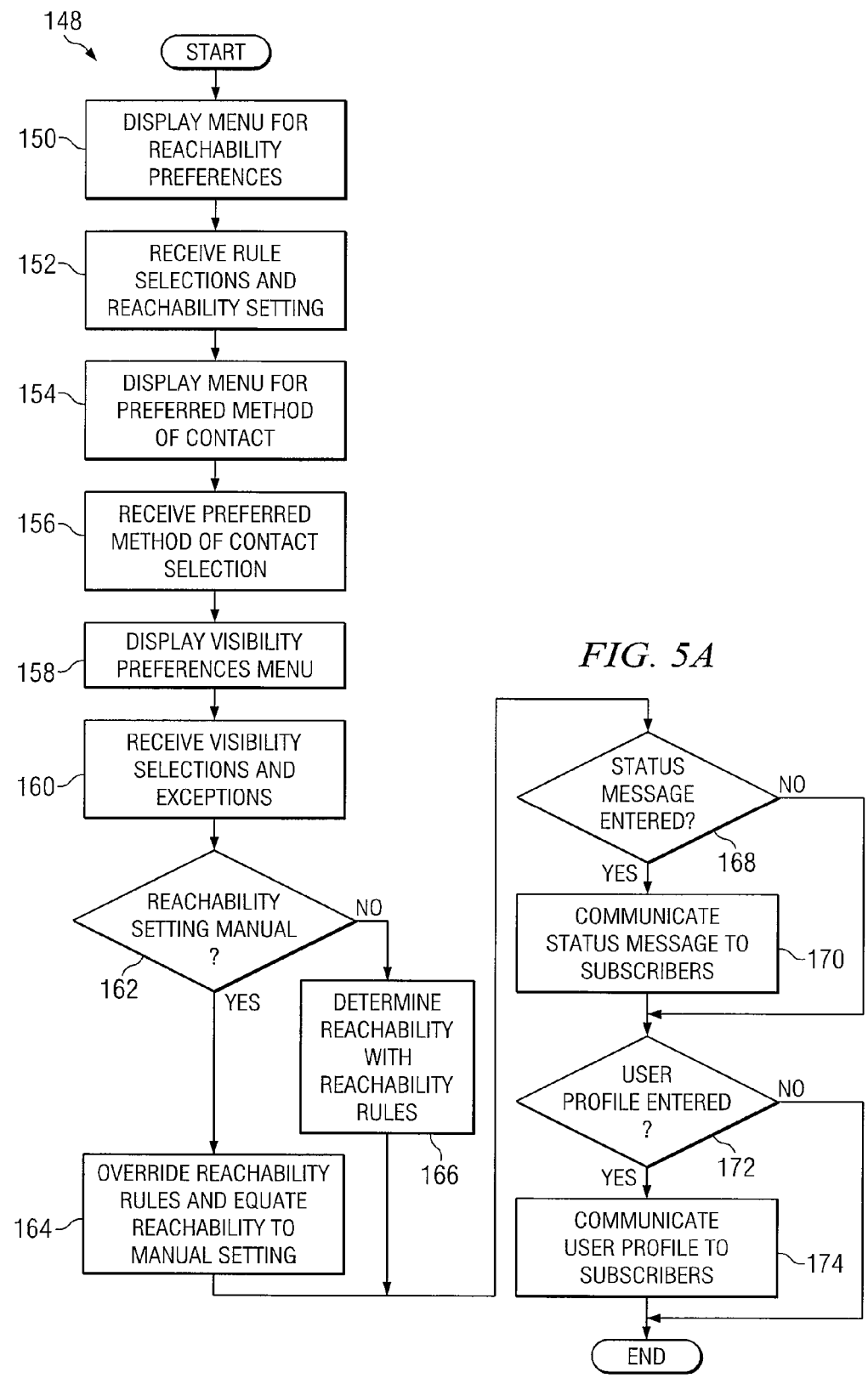
FIGS. 5A-5B are flowcharts illustrating methods of operation for customization of reachability and visibility rules and receipt of information from a system providing aggregate reachability status.
Figure 5B:
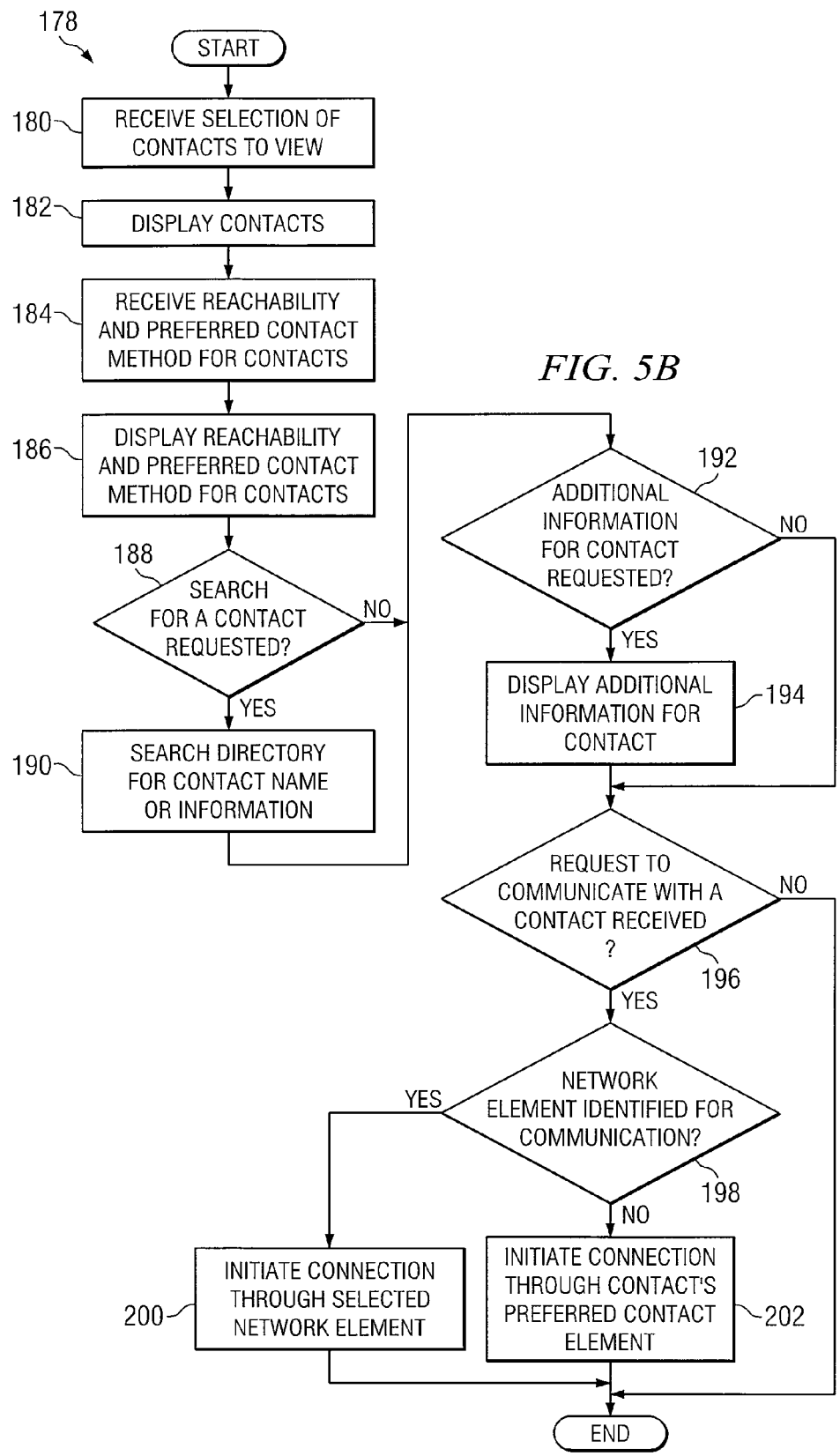

FIGS. 5A-5B depict flowcharts illustrating methods of operation for customization of reachability and visibility rules and receipt of information from a system providing aggregate reachability status. FIG. 5A is a flowchart illustrating a method 148 for customization of the reachability rules and visibility preferences of user 18. At step 150, presence aggregation system 16 displays a menu to user 18 that provides options for customizing reachability preferences. This menu may be displayed to user 18 through user interface 50. Users 18 may customize their reachability preferences by selecting checkboxes 54 corresponding to various reachability rules 60, 62, 64, 66 in user interface 50. At step 152, presence aggregation system 16 receives the reachability rules chosen by user 18 and reachability settings set by user 18. The reachability settings may be set to either one of manual options 100 or automatic option 98. Manual option 100 would directly determine the reachability status of user 18, where automatic option 98 would require presence aggregation system 16 to determine reachability status from reachability rules. In particular embodiments, user interface 20 operates on behalf of presence aggregation system 16 to display menus to and receive input from user 18.

In step 154, presence aggregation system 16 displays a menu, which allows user 18 to select a preferred method of contact 102. This menu may be similar to settings menu 96 or drop down menu 76. The preferred method of contact 102 may indicate the manner in which user 18 would prefer to be contacted by subscribers (other users 18 and/or remote subscriber 38). Presence aggregation system 16 receives the preferred method of contact 102 selection at step 156.

At step 158, presence aggregation system 16 displays a visibility preferences menu, which may be similar to user interface 120, and receives visibility selections and/or exceptions at step 160. User 18 may indicate which of contacts 88 are authorized to receive what information through the visibility preferences menu. User 18 may specify which contacts 88 can receive reachability status and/or presence statuses. In some embodiments, user 18 can customize his visibility so that certain subscribers 18, 38 are authorized to obtain a variety of combinations of reachability status and presence statuses. Although user interface 120 is described, it should be understood that the visibility customization may be accomplished by a more complex method. In particular embodiments, reachability engine 22 operates on behalf of presence aggregation system 16 to process visibility preferences received from user 18.

At step 162, presence aggregation system 16 determines whether user 18 selected one of manual options 100 by evaluating the reachability setting. If user 18 selected one of manual options 100, the method proceeds to step 164, where presence aggregation system 16 overrides the reachability rules and sets reachability status to be the reachability state indicated by the selected one of manual options 100. The method then continues to step 168. If, on the other hand, user 18 selected automatic option 98, the method proceeds from step 162 to step 166, where presence aggregation system 16 determines reachability status for user 18 by applying reachability rules to the current presence statuses of network elements 36 associated with user 18. In some embodiments, reachability engine 22 of presence aggregation system 16 performs the functions described in steps 162, 164, and 166.

From either step 164 or step 166, the method proceeds to step 168, where presence aggregation system 16 determines whether user 18 entered a status message. For example, user 18 could enter a status message by selecting item 104 in settings menu 96. If a status message has been entered, presence aggregation system 16 communicates the status message to subscribers 18, 38 who are authorized to receive the status message, step 170. In either case, the method proceeds to step 172. In step 172, presence aggregation system 16 determines whether a user profile has been entered. For example, user 18 could enter a user profile by selecting item 106 in settings menu 96. If a user profile has not been entered, the method ends. Otherwise, presence aggregation system 16 communicates the user profile to subscribers 18, 38 who are authorized to receive the user profile in step 174, and the method ends. In some embodiments, presence aggregation system 16 determines which subscribers 18, 38 are authorized to receive the status message and/or the user profile from application of visibility rules identified by user 18 in step 160.

FIG. 5B is a flowchart illustrating a method 178 by which user 18 can view reachability statuses and other information associated with contacts 88. At step 180, presence aggregation system 16 receives a selection from user 18 indicating which contacts 88 the system should display to user 18. For example, user 18 might indicate this selection through drop down menu 86 displayed in GUI 70. In particular embodiments, user interface 20 of presence aggregation system 16 functions to display menus to and to receive input from user 18. At step 182, presence aggregation system 16 displays contacts 88 selected by user 18. Selected contacts 88 may be displayed in GUI 70, illustrated in FIG. 3A, or any appropriate graphical user interface.

At step 184, presence aggregation system 16 receives reachability status information and the preferred contact methods for contacts 88. Assuming user 18 is authorized to receive information associated with contacts 88, presence aggregation system 16 displays the information received for contacts 88 at step 186. For example, as illustrated in FIG. 3A, the GUI 70 displays a particular contact 88, who is identified by name 88a, and the reachability status 88b and preferred contact method 88c associated with the particular contact 88. In some embodiments, user 18 can select specific contacts 88 for whom presence aggregation system 16 should display a particular set of information. In particular embodiments, user 18 receives information regarding contacts 88 at a variety of locations specified by user 18.

In step 188, presence aggregation system 16 determines whether a search for contact 88 has been requested. For example, user 18 may indicate a desire to search for a particular contact 88 by entering information into search section 94 of GUI 70. If a search has been requested, the directory or other indicated database is searched for the name or other information associated with contact 88 in step 190. After the search is completed or if no search was requested, the method proceeds to step 192. In step 192, presence aggregation system 16 determines whether additional information for contact 88 has been requested. If so, presence aggregation system 16 retrieves and displays additional information for contact 88 in step 194; otherwise, the method skips step 194 and proceeds to step 196. For example, user 18 could request additional information such as a list of network elements 36 associated with contact 88 and the presence statuses of those network elements 36.

In step 196, presence aggregation system 16 determines whether a request to communicate with one of contacts 88 has been received. If a request to communicate with one of contacts 88 has not been received, the method ends. If user 18 has requested a communication with one of contacts 88, presence aggregation system 16 determines whether user 18 identified a particular network element 36 for the communication, step 198. If user 18 specified a particular network element 36, presence aggregation system 16 initiates a connection between user 18 and the selected contact 88 through the selected network element 36, step 200. If user 18 did not specify a particular network element 36 in step 198, presence aggregation system 16 proceeds to step 202 and initiates the connection through the preferred contact method for selected contact 88.

The methods described with respect to FIGS. 5A-5B are merely illustrative, and it is understood that the manner of operation and devices indicated as performing the operations may be modified in any appropriate manner. Particular methods for customizing reachability and visibility rules and providing aggregate reachability status have been described, but these methods are not intended to be all inclusive. While the methods describe particular steps performed in a specific order, it should be understood that system 10 contemplates any suitable collection and arrangement of elements performing some, all, or none of these steps in any operable order.

Figure 6:
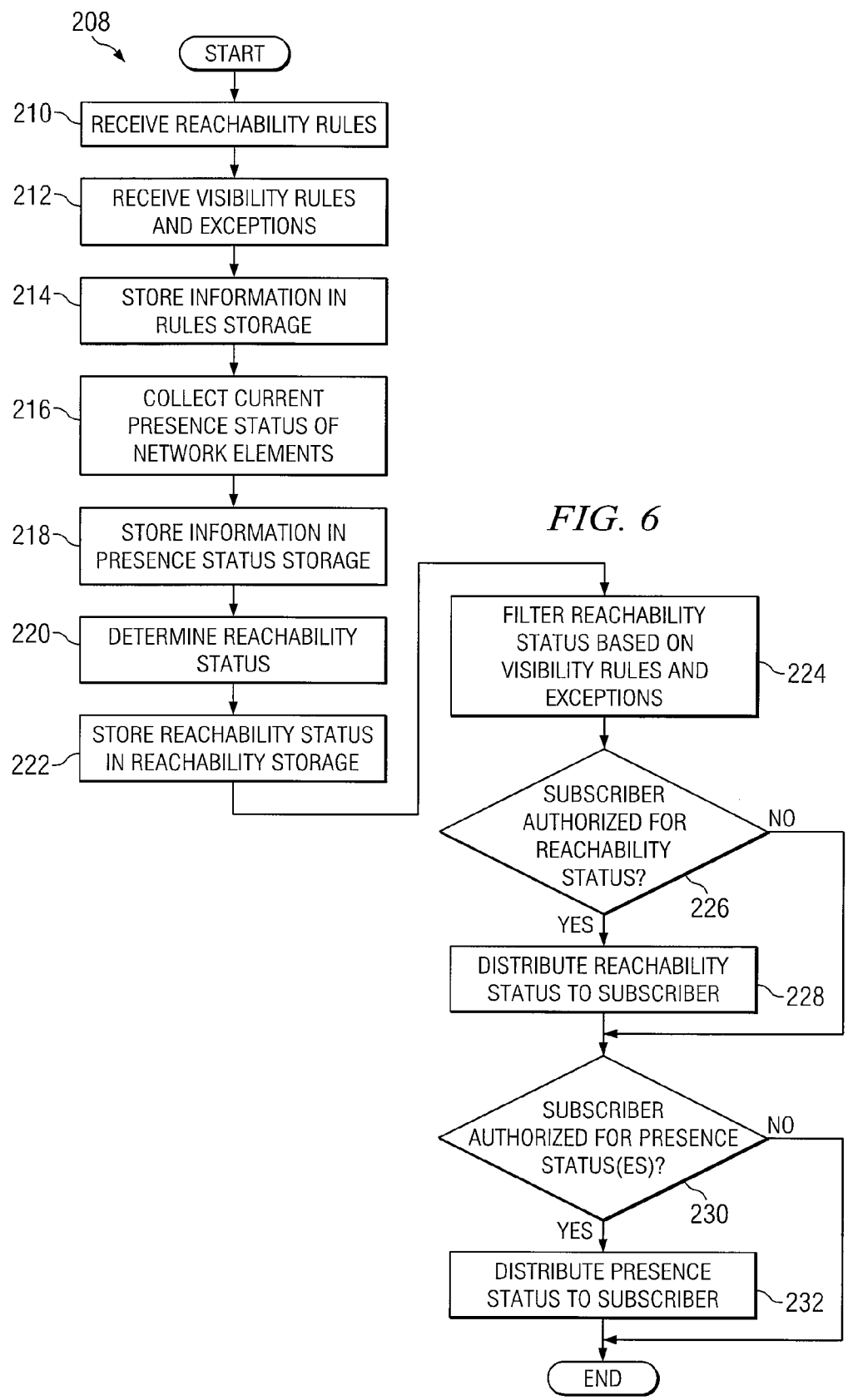
FIG. 6 is a flowchart illustrating a method for aggregating reachability rules, visibility rules, and presence statuses of network elements to determine an aggregate reachability for a user.

FIG. 6 is a flowchart illustrating a method 208 for aggregating reachability rules, visibility rules, and presence statuses of network elements 36 to determine an aggregate reachability status for one of users 18. The method begins when presence aggregation system 16 receives reachability rules from user 18 in step 210. Then, presence aggregation system 16 receives visibility rules and exceptions, step 212. In step 214, presence aggregation system 16 stores the received reachability rules and visibility rules and exceptions in rules storage 32. Then, presence aggregation system 16 collects the current presence statuses of network elements 36 associated with user 18 in step 216. Presence aggregation system 16 stores the presence status information in the presence storage 30 in step 218 and determines the reachability status of user 18 in step 220. Reachability status may be determined by applying the presence statuses of network elements 36 associated with user 18 to the reachability rules selected by user 18. In some embodiments, this determination is made by reachability engine 22. The method then proceeds to step 222 where the reachability status of user 18 is stored in reachability storage 28. In step 224, reachability status is filtered based upon the visibility rules and exceptions selected by user 18.

In step 226, presence aggregation system 16 determines if a requesting subscriber 18, 38 is authorized to receive the reachability status of user 18. If so, presence aggregation system 16 distributes reachability status to the requesting subscriber 18, 38 in step 228. In some embodiments, the visibility rules and exceptions provided by user 18 will indicate that the requesting subscriber 18, 38 is not authorized to receive reachability status. Also, the visibility rules and exceptions may specify that the requesting subscriber 18, 38 receives a different reachability status than that received by others of subscribers 18, 38. In particular embodiments, reachability engine 22 operates on behalf of presence aggregation system 16 to distribute reachability status.

In step 230, presence aggregation system 16 determines if a requesting subscriber 18, 38 is authorized to receive the presence statuses of network elements 36 associated with user 18. If so, presence aggregation system 16 distributes presence statuses to the requesting subscriber 18, 38 in step 232. In some embodiments, requesting subscriber 18, 38 is only authorized to receive the presence statuses corresponding to particular ones of network elements associated with user 18. In that case, presence aggregation system 16 only distributes the presence statuses authorized to the requesting subscriber 18, 38. In particular embodiments, subscriber 18, 38 receives, requests, and/or uses the presence statuses of network elements 36 associated with user 18 in a specific way based upon the current reachability status of user 18. In some embodiments, presence engine 22 operates on behalf of presence aggregation system 16 to distribute presence statuses. In some embodiments, steps 228 and 232, if preformed, are preformed concurrently so that subscribers 18, 38 authorized to receive both the reachability status and presence statuses of user 18 will receive all information in one notification.

The method described with respect to FIG. 6 is merely illustrative, and it is understood that the manner of operation and devices indicated as performing the operations may be modified in any appropriate manner. While the method describes particular steps performed in a specific order, it should be understood that system 10 contemplates any suitable collection and arrangement of elements performing some, all, or none of these steps in any operable order.

Although the present invention has been described in several embodiments, a myriad of changes and modifications may be suggested to one skilled in the art, and it is intended that the present invention encompass such changes and modifications as fall within the present appended claims.

What is claimed is:

1. A method of providing reachability status to subscribers comprising: presenting a plurality of reachability states, each reachability state representing an aggregate accessibility of a user derived from a plurality of statuses each corresponding to one of a plurality of network elements associated with the user; for each of the reachability states, presenting at least one reachability rule, each reachability rule corresponding to one of the network elements and indicating a status for satisfying the reachability rule; receiving a selection of one or more of the reachability rules; accessing a central storage maintaining the statuses corresponding to the network elements; identifying an ordering of the reachability rules; until a current reachability status is selected: identifying one of the reachability rules based on the identified ordering; determining whether the identified reachability rule is satisfied; and if the identified reachability rule is satisfied, selecting the reachability state associated with the identified reachability rule as the current reachability status; determining one or more subscribers for receiving the current reachability status; and communicating the current reachability status to subscribers.

2. The method of claim 1, wherein the reachability rules are presented in an order corresponding to the identified ordering of the reachability rules.

3. The method of claim 1, further comprising: receiving a selection of a preferred contact method; determining one or more subscribers for receiving a notification of the preferred contact method; and communicating the notification of the preferred contact method to the one or more determined subscribers.

4. The method of claim 1, further comprising: receiving a selection of one of a plurality of manual reachability states; setting the current reachability status to the selected one of the manual reachability states.

5. The method of claim 1, further comprising: receiving a visibility rule specifying a set of information that can be communicated to subscribers, wherein the set of information includes identified ones of the current reachability status and the plurality of statuses corresponding to the plurality of network elements associated with the user; applying the visibility rule to determine which information is communicated to subscribers.

6. The method of claim 1, wherein at least one of the one or more selected reachability rules: corresponds to a plurality of network elements, and for each of the plurality of network elements, indicates a status for satisfying the reachability rule.

7. The method of claim 1, further comprising: receiving a plurality of rule sets, wherein each rule set indicates a selection of one or more of the reachability rules; receiving a rule set selection, wherein the rule set selection identifies one of the rule sets; and selecting the reachability rules for the reachability states according to the rule set identified by the rule set selection.

8. The method of claim 1, wherein the plurality of reachability states includes On Vacation, Out of Office, Unavailable, Do Not Disturb, Busy, Interruptible but Busy, Available, and Unknown.

9. A device for providing reachability status to subscribers comprising: a plurality of network elements associated with a user; a user interface operable to present a plurality of reachability states, wherein each reachability state represents an aggregate accessibility of the user derived from a plurality of statuses each corresponding to one of the plurality of network elements, and to present at least one reachability rule for each of the reachability states, wherein each reachability rule corresponds to one of the network elements and indicates a status for satisfying the reachability rule; and a presence aggregation system comprising a memory, the presence aggregation system operable: to receive a selection of one or more of the reachability rules, to access a central storage maintaining the statuses corresponding to the network elements, to identify an ordering of the reachability rules; the presence aggregation system further operable to, until a current reachability status is selected, identify one of the reachability rules based on the identified ordering, determine whether the identified reachability rule is satisfied, and select the reachability state associated with the identified reachability rule as the current reachability status if the identified reachability rules is satisfied; and the presence aggregation system further operable to determine one or more subscribers for receiving the current reachability status and to communicate the current reachability status to subscribers.

10. The device of claim 9, wherein the user interface is operable to present the reachability rules in an order corresponding to the ordering of the reachability rules identified by the presence aggregation system.

11. The device of claim 9, wherein the presence aggregation system is further operable to: receive a selection of a preferred contact method; determine one or more subscribers for receiving a notification of the preferred contact method; and communicate the notification of the preferred contact method to the one or more determined subscribers.

12. The device of claim 9, wherein the presence aggregation system is further operable to: receive a selection of one of a plurality of manual reachability states; set the current reachability status to the selected one of the manual reachability states.

13. The device of claim 9, wherein the presence aggregation system is further operable to: receive a visibility rule specifying a set of information that can be communicated to subscribers, wherein the set of information includes identified ones of the current reachability status and the plurality of statuses corresponding to the plurality of network elements associated with the user; apply the visibility rule to determine which information is communicated to subscribers.

14. The device of claim 9, wherein at least one of the one or more selected reachability rules: corresponds to a plurality of network elements, and for each of the plurality of network elements, indicates a status for satisfying the reachability rule.

15. The device of claim 9, wherein the presence aggregation system is further operable to: receive a plurality of rule sets, wherein each rule set indicates a selection of one or more of the reachability rules; receive a rule set selection, wherein the rule set selection identifies one of the rule sets; and select the reachability rules for the reachability states according to the rule set identified by the rule set selection.

16. The device of claim 9, wherein the plurality of reachability states includes On Vacation, Out of Office, Unavailable, Do Not Disturb, Busy, Interruptible but Busy, Available, and Unknown.

17. A non-transitory computer readable medium encoding logic for providing reachability status to subscribers, the logic operable when executed to: present a plurality of reachability states, each reachability state representing an aggregate accessibility of a user derived from a plurality of statuses each corresponding to one of a plurality of network elements associated with the user; for each of the reachability states, present at least one reachability rule, each reachability rule corresponding to one of the network elements and indicating a status for satisfying the reachability rule; receive a selection of one or more of the reachability rules; access a central storage maintaining the statuses corresponding to the network elements; identify an ordering of the reachability rules; until a current reachability status is selected: identify one of the reachability rules based on the identified ordering; determine whether the identified reachability rule is satisfied; and if the identified reachability rule is satisfied, select the reachability state associated with the identified reachability rule as the current reachability status; determine one or more subscribers for receiving the current reachability status; and communicate the current reachability status to subscribers.

18. The non-transitory computer readable medium of claim 17, wherein the reachability rules are presented in an order corresponding to the identified ordering of the reachability rules.

19. The non-transitory computer readable medium of claim 17, further operable to: receive a selection of a preferred contact method; determine one or more subscribers for receiving a notification of the preferred contact method; and communicate the notification of the preferred contact method to the one or more determined subscribers.

20. The non-transitory computer readable medium of claim 17, further operable to: receive a selection of one of a plurality of manual reachability states; set the current reachability status to the selected one of the manual reachability states.

21. The non-transitory computer readable medium of claim 17, further operable to: receive a visibility rule specifying a set of information that can be communicated to subscribers, wherein the set of information includes identified ones of the current reachability status and the plurality of statuses corresponding to the plurality of network elements associated with the user; apply the visibility rule to determine which information is communicated to subscribers.

22. The non-transitory computer readable medium of claim 17, wherein at least one &the one or more selected reachability rules: corresponds to a plurality of network elements, and for each of the plurality of network elements, indicates a status for satisfying the reachability rule.

23. The non-transitory computer readable medium of claim 17, further operable to: receive a plurality of rule sets, wherein each rule set indicates a selection of one or more of the reachability rules; receive a rule set selection, wherein the rule set selection identifies one of the rule sets; and select the reachability rules for the reachability states according to the rule set identified by the rule set selection.

24. The non-transitory computer readable medium of claim 17, wherein the plurality of reachability states includes On Vacation, Out of Office, Unavailable, Do Not Disturb, Busy, Interruptible but Busy, Available, and Unknown.

25. A system for providing reachability status to subscribers comprising: means for presenting a plurality of reachability states, each reachability state representing an aggregate accessibility of a user derived from a plurality of statuses each corresponding to one of a plurality of network elements associated with the user; means for presenting at least one reachability rule for each of the reachability states, each reachability rule corresponding to one of the network elements and indicating a status for satisfying the reachability rule; means for receiving a selection of one or more of the reachability rules; means for accessing a central storage maintaining the statuses corresponding to the network elements; means for identifying an ordering of the reachability rules; means for selecting a current reachability status comprising: means for identifying one of the reachability rules based on the identified ordering; means for determining whether the identified reachability rule is satisfied; and means for selecting the reachability state associated with the identified reachability rule as the current reachability status if the identified reachability rule is satisfied; means for determining one or more subscribers for receiving the current reachability status; and means for communicating the current reachability status to subscribers.

* * * * *